June 19, 1962     I. F. WEISS     3,040,243

TEST CIRCUIT FOR AN INDICATOR SYSTEM

Filed March 20, 1959

INVENTOR.
IRVING F. WEISS
BY Pyle & Fisher
ATTORNEYS

United States Patent Office 3,040,243
Patented June 19, 1962

3,040,243
TEST CIRCUIT FOR AN INDICATOR SYSTEM
Irving F. Weiss, Cleveland, Ohio, assignor to
ECP Corporation
Filed Mar. 20, 1959, Ser. No. 800,818
4 Claims. (Cl. 324—20)

This invention relates to test indicating panels and more particularly to an improved circuit for simultaneously testing the operativeness of a plurality of condition indicators.

In modern automated machinery, lights or other condition indicators are frequently used to indicate a condition of a given part of a machine. Such condition indicating means, usually a form of incandescent lamp, present a problem in that the operator cannot be sure of the reason a light is not illuminated. He cannot know with certainty whether the circuit is inactive, or by chance the indicating light is defective.

One of the principal objects of the present invention is to provide a novel and improved electrical circuit which includes parallel connections to a plurality of lamps, or other condition indicators, so connected that the lamps may be simultaneously tested without interrupting the lamp indicating function or the operation of the machine.

The primary object of this invention is to provide a test means for activating all of the condition indicating devices of a control panel simultaneously to ascertain their operating condition.

Another object of this invention is to provide such test means in such electrical circuitry that all of the indicating devices are supplied with proper operating power without harm, regardless of whether they are in operation at the time of testing.

Another object of this invention is to arrange the operating circuitry from the controlled apparatus to the indicating devices, and from an external power source to the indicating devices, in such a manner that the power from the external source cannot feed through the indicating devices to the circuitry of the controlled apparatus.

As indicated, this invention is believed to be adaptable to many possible condition indicating devices, but generally such devices consist of low wattage incandescent lamps. Therefore, the description of the preferred embodiment will hereinafter be directed to such lamp indicators, and more specifically, as applied to control panels.

Figure 1:
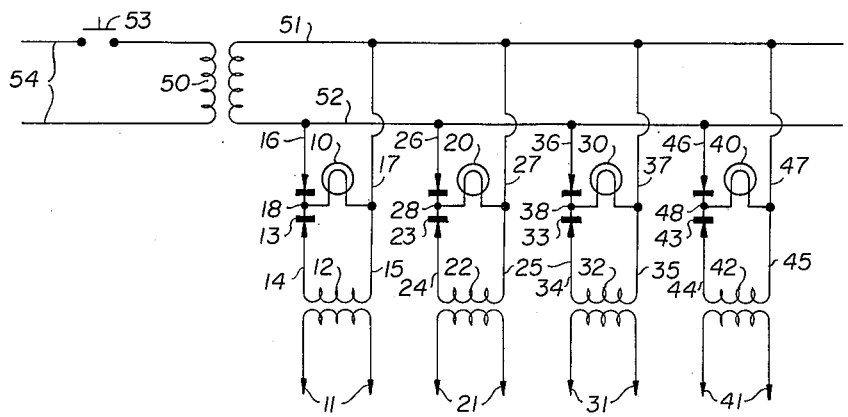
Figure 2:
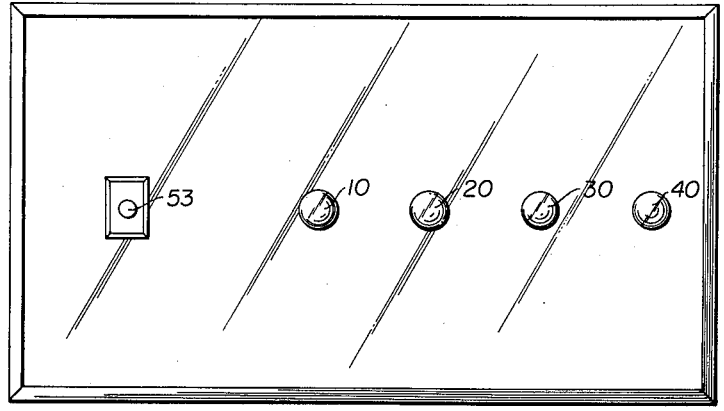

These listed objects will outline the invention, but other objects and a fuller understanding of the invention may be had by referring to the following description and claims, taken in conjunction with the accompanying drawing, in which:

FIGURE 1 is a wiring diagram showing the novel and improved test indicating circuit and a plurality of condition indicating circuits; and, FIGURE 2 is a front elevational view of a panel having a plurality of condition indicating lamps and a test circuit activation button.

Referring to the drawings, a plurality of indicating lamps are designated by the numbers 10, 20, 30, 40. It will be recognized that while four such test lamps have been shown, the invention is operable with any number of test lamps. A plurality of sources of current to the lamps are separately designated by the numerals 11, 21, 31, 41. Each of the sources of indicating current is series connected to the primary coil of a transformer 12, 22, 32, 42 respectively. A plurality of center tap rectifiers 13, 23, 33, 43 are provided. The rectifiers 13, 23, 33, 43 have center taps 18, 28, 38, 48 respectively which are connected to the lamps 10, 20, 30, 40 respectively. The secondary winding of the transformer 12 is series connected to one side of the rectifier 13 by a conductor 14 and to one side of the lamp 10 by a conductor 15. Conductors 24 and 25, 34 and 35, 44 and 45 form similar connections with the remainder of the transformer secondary coils, lamps and rectifier 13. A second test circuit conductor 17 is connected along with the conductor 16 to the other side of the lamp 10 or, as shown, the second test circuit conductor is connected to the conductor 16. Comparable connections are formed with conductors 26 and 27, 36 and 37, 46 and 47 and the remainder of the rectifiers and lamps. The connections so formed provide a plurality of test circuits.

A test transformer 50 is provided. Conductors 51, 52 are series connected to the secondary winding of the transformer 50. The conductor 51 is connected to the conductors 17, 27, 37, 47 and the conductor 52 is connected to the conductors 16, 26, 36, 46 to connect each of the test circuits in series with the transformer 50 and to connect the test circuits in parallel with one another.

A test circuit control switch 53 is series connected to the primary winding of the transformer 50 and a source of test current 54. Closing of the switch 53 will activate the coils of the transformer 50 and cause current to be conducted through the conductors 51, 52 to each of the lamps to cause each of the lamps to light. Therefore, if one lamp is faulty, a visual inspection will readily reveal this fault since all lamps should be lit when the switch 53 is closed.

One of the outstanding advantages of this invention is achieved through the rectifiers. It will be seen that half wave rectifier current is transmitted to each of the lamps by the test circuits. Since current can only flow in one direction through a rectifier, the rectifier will prevent test currents from passing into the indicating circuits, with the possibility of initiating an electrically controlled operation by such stray current. Conversely, indicating current cannot pass through the test circuit because of the rectifiers. Thus, if the indicating lamp 10 is lit to show the condition of one part of a device, the test circuits will prevent the lamps 20, 30, 40 from being effected.

It is desirable to "phase" the test transformer 50 with each of the indicating transformers 12, 22, 32, 42.

The existence of two voltages applied to the same load and out of phase with each other, will increase the average voltage and will tend to overload and thereby shorten the life of the lamps. Phasing of the transformers prevents this overload condition. Since each side of the center tap rectifiers is one way and only allows half wave current to pass through, it is possible to prevent lamp overload by the simple expedient of keeping the transformers in phase with one another.

It will be seen that a novel and improved condition indicating device has been provided in which a plurality of indicators are each series connected in an indicating circuit and in which parallel connections between the indicators are made in a test circuit and in which a center tap rectifier is connected to each of the lamps to permit both indicating and test current to be conducted to the lamps but to prevent indicating current from passing into the test circuit and test current from passing into the indicating circuits.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An indicator system and indicator test circuit, in combination, comprising, a direct current activated condition indicator, an alternating current indicator electrical circuit connected to said indicator, an alternating current test electrical circuit connected to said indicator, a unidirectional device in said indicator circuit adapted to pass electrical activation current in one direction only, a similar device in the test circuit, first power means electrically connected in said alternating current indicator electrical circuit, second power means electrically connected to said alternating current test electrical circuit, each unidirectional device being connected in series between its respective power source and indicator, each unidirectional device being connected to pass current from its source through its indicator, said unidirectional means connected to the same indicator being connected to pass current through the indicator in the same direction.

2. In an indicator system the improvement which comprises a plurality of direct current activated indicators, a like number of center tap back to back rectifiers having first and second sides, each such indicator having a first and second connection member, one of said members being connected to a center tap of one rectifier, a like number of pairs of alternating current indicating conductors; each pair of indicating conductors being series connected to a source of alternating indicating current to the first side of one of the rectifiers and the other connection member of the indicator, a like number of pairs of alternating current test conductors; each pair of test conductors being series connected to the second side of each rectifier and to said other connection member of one of the indicators; a pair of test current source conductors series connected to a source of alternating test current and forming parallel connections between the alternating current test conductors, and a switch connected to the source of test circuit potential for selective simultaneous activation of all of the test circuits.

3. In an indicator system the improvement which comprises, a plurality of direct current activated indicators, a like number of center tap back to back rectifiers having first and second sides, each such indicator having first and second connection members, one of said members being connected to a center tap of one rectifier; a like number of pairs of alternating current indicating conductors; each pair of indicating conductors being series connected to a source of alternating indicating current to the first side of one of the rectifiers and the other connection member of the indicator; a like number of pairs of alternating current test conductors; each pair of test conductors being series connected to the second side of each rectifier and to said other connection member of one of the indicators; a test current transformer, a pair of alternating test current source conductors series connected to the secondary of the transformer and forming parallel connections between the alternating current test conductors, and a switch series connected to the transformer primary and a source of test current, whereby to provide a device in which closing of the switch will simultaneously test all the indicators without affecting the operation of the indicating circuits.

4. In an indicator system the improvement which comprises, a plurality of direct current activated indicators, a like number of indicator activating circuits electrically connected each to one of said indicators for conducting indicating current to said indicators, each indicator activating circuit having rectifier means in series with the indicator of that indicator activating circuit, a single test circuit, said indicators being parallel connected in said test circuit, said test circuit having alternating current generating means, said test circuit having rectifier means, said rectifier means of said test circuit being series connected to each indicator, said rectifier means of said indicator activating circuits and said test circuit being in back to back series opposition to prevent flow of indicating current in the test circuit and test current in the indicating circuits.

References Cited in the file of this patent
UNITED STATES PATENTS

| | | |
|---|---|---|
| 2,127,343 | Parlett | Aug. 16, 1938 |
| 2,612,551 | Kreiner | Sept. 30, 1952 |
| 2,839,741 | Kratville | June 17, 1958 |